(12) United States Patent
Oliver et al.

(10) Patent No.: US 10,162,967 B1
(45) Date of Patent: Dec. 25, 2018

(54) METHODS AND SYSTEMS FOR IDENTIFYING LEGITIMATE COMPUTER FILES

(71) Applicant: Trend Micro Incorporated, Tokyo (JP)

(72) Inventors: Jonathan James Oliver, Kew (AU); Jayson Pryde, Manila (PH); Victor Hargrave, San Mateo, CA (US); Scott Forman, San Mateo, CA (US); Chun Cheng, San Mateo, CA (US)

(73) Assignee: Trend Micro Incorporated, Tokyo (JP)

( * ) Notice: Subject to any disclaimer, the term of this patent is extended or adjusted under 35 U.S.C. 154(b) by 174 days.

(21) Appl. No.: 15/239,213

(22) Filed: Aug. 17, 2016

(51) Int. Cl.
| | |
|---|---|
| G06F 21/56 | (2013.01) |
| G06F 21/57 | (2013.01) |
| H04L 29/06 | (2006.01) |
| H04L 9/32 | (2006.01) |
| G06N 99/00 | (2010.01) |

(52) U.S. Cl.
CPC ............ G06F 21/57 (2013.01); G06F 21/565 (2013.01); G06N 99/005 (2013.01); H04L 9/3236 (2013.01); H04L 63/145 (2013.01); G06F 2221/2101 (2013.01)

(58) Field of Classification Search
None
See application file for complete search history.

(56) References Cited

U.S. PATENT DOCUMENTS

| | | | | |
|---|---|---|---|---|
| 7,865,947 | B2 * | 1/2011 | Fanton ............... | G06F 21/10 713/150 |
| 8,375,450 | B1 * | 2/2013 | Oliver ................. | G06F 21/564 726/24 |
| 8,769,683 | B1 * | 7/2014 | Oliver ................. | G06F 21/561 719/311 |
| 8,925,087 | B1 * | 12/2014 | Oliver ................. | H04L 51/12 713/188 |
| 9,197,665 | B1 * | 11/2015 | Cabot ................. | G06F 21/564 |
| 9,361,458 | B1 * | 6/2016 | Feng .................. | G06F 21/564 |
| 9,690,937 | B1 * | 6/2017 | Duchin ............... | G06F 21/562 |
| 9,690,938 | B1 * | 6/2017 | Saxe .................. | G06F 21/563 |

(Continued)

OTHER PUBLICATIONS

Himanshu Pareek, et al. "Application Whitelisting: Approaches and Challenges", Oct. 2012, pp. 13-18, International Journal of Computer Science, Engineering and Information Technology (IJCSEIT), vol. 2, No. 5.

Jonathan Oliver, et al. "Using Randomization to Attack Similarity Digests", Nov. 2014, pp. 199-210, ATIS 2014 available at https://github.com/trendmicro/tlsh/blob/master/Attacking_LSH_and_Sim_Dig.pdf.

(Continued)

*Primary Examiner* — Malcolm Cribbs
(74) *Attorney, Agent, or Firm* — Okamoto & Benedicto LLP

(57) ABSTRACT

A system for evaluating a target file includes an endpoint computer that receives similarity digests of legitimate files, receives a target file, and generates a similarity digest of the target file. The endpoint computer determines whether or not the target file is legitimate based on a comparison of the similarity digest of the target file against the similarity digests of the legitimate files. The system further includes a backend computer system that receives the legitimate files, generates the similarity digests of the legitimate files, and provides the similarity digests of the legitimate files to the endpoint computer.

9 Claims, 8 Drawing Sheets

(56) References Cited

U.S. PATENT DOCUMENTS

| | | | | |
|---|---|---|---|---|
| 2009/0083852 | A1* | 3/2009 | Kuo | G06F 21/564 726/22 |
| 2009/0183261 | A1* | 7/2009 | Peinado | G06F 21/565 726/24 |
| 2013/0111591 | A1* | 5/2013 | Topan | G06F 21/563 726/24 |
| 2013/0276120 | A1* | 10/2013 | Dalcher | G06F 21/554 726/24 |
| 2013/0291085 | A1* | 10/2013 | Chong | G05B 19/048 726/10 |
| 2013/0291115 | A1* | 10/2013 | Chong | G05B 19/4185 726/25 |
| 2014/0090063 | A1* | 3/2014 | Calnan | G06F 8/68 726/25 |
| 2016/0072833 | A1* | 3/2016 | Kim | H04L 63/1425 726/23 |
| 2016/0078229 | A1* | 3/2016 | Gong | G06F 21/577 726/24 |
| 2016/0294849 | A1* | 10/2016 | Adams | G06F 21/56 |
| 2016/0328579 | A1* | 11/2016 | Jois | G06F 21/56 |
| 2017/0124325 | A1* | 5/2017 | Alme | G06F 21/56 |
| 2017/0193230 | A1* | 7/2017 | Jevnisek | G06F 21/565 |

OTHER PUBLICATIONS

Jonathan Oliver, et al. "TLSCH—A Locality Sensitive Hash", Nov. 2013, 7 pages, 4th Cybercrime and Trustworthy Computing Workshop, Sydney, available at https://github.com/trendmicro/tlsh/blob/master/TLSH_CTC_final.pdf.

Vassil Roussev "An evaluation of forensic similarity hashes", Digital Investigation 2011, pp. S34-S41, available it www.sciencedirect.com.

Vassil Roussev "Data Fingerprinting with Similarity Digests", 2010, pp. 109-128, Research Advances in Digital Forensics VI.

Frank Breitinger "Security and Implementation Analysis of the Similarity Digest sdhash", 2012, 16 pages, 1st International Baltic Conference on Network Security & Forensics (NeSeFo), Tartu (Estland).

Janet Lo "Whitelisting for Cyber Security: What it means for Consumers", Nov. 2010, pp. 1-40, The Public Interest Advocacy Centre, Ottawa, Ontario.

Jesse Kornblum "Identifying almost identical files using context triggered piecewise hashing", 2006, pp. S91-97, Proceedings of the 6th Annual DFRWS, Elsevier.

Frank Breitinger "Sicherheitsaspekte von fuzzy-hashing", 2011, 106 pages, Master's thesis, Hochschule Darmstadt.

* cited by examiner

METHODS AND SYSTEMS FOR IDENTIFYING LEGITIMATE COMPUTER FILES

BACKGROUND OF THE INVENTION

1. Field of the Invention

The present invention relates generally to computer security, and more particularly but not exclusively to methods and systems for identifying legitimate computer files.

2. Description of the Background Art

A computer system may incorporate a computer security mechanism for evaluating files that are on or introduced into the computer system to make sure the files are legitimate. For example, the files may be inspected for malware, such as viruses, Trojans, rootkits, spyware, and other malicious codes. The files may also be inspected to ensure that they are authorized to be run, stored, or opened on the computer system. Because of the large number of files that are available on a computer system and the Internet at large, mechanisms for evaluating computer files are preferably fast and scalable.

SUMMARY

In one embodiment, a system for evaluating a target file includes an endpoint computer that receives similarity digests of legitimate files, receives a target file, and generates a similarity digest of the target file. The endpoint computer determines whether or not the target file is legitimate based on a comparison of the similarity digest of the target file against the similarity digests of the legitimate files. The system further includes a backend computer system that receives the legitimate files, generates the similarity digests of the legitimate files, and provides the similarity digests of the legitimate files to the endpoint computer.

These and other features of the present invention will be readily apparent to persons of ordinary skill in the art upon reading the entirety of this disclosure, which includes the accompanying drawings and claims.

Figure 1:
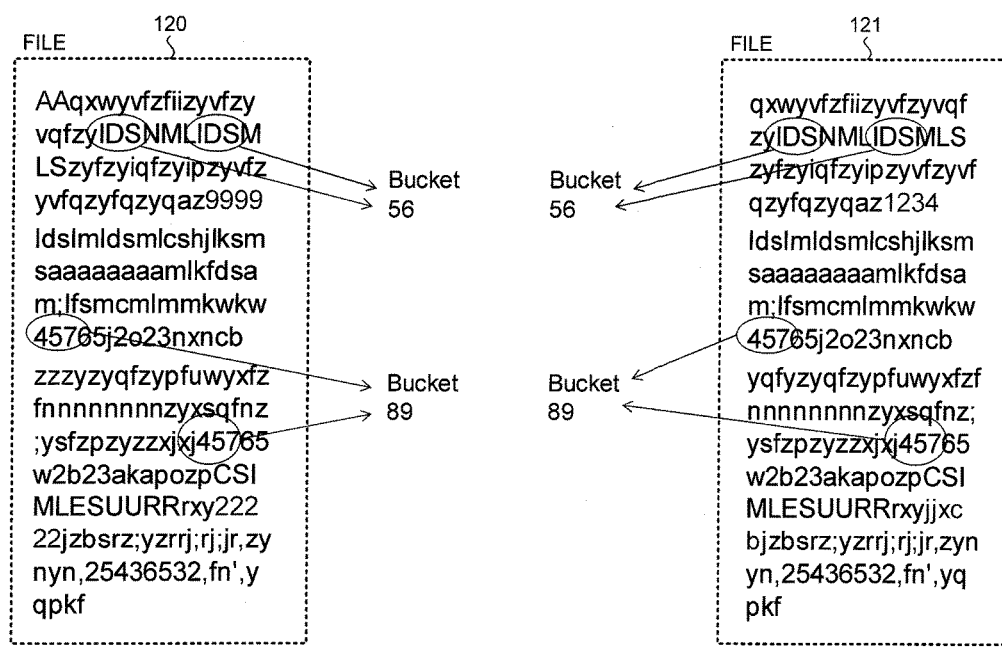
FIG. 1 schematically illustrates locality sensitive hashing that may be employed in embodiments of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Computer systems may employ some form of whitelisting for screening, execution control, verification, or other purpose. Generally speaking, a whitelist may comprise a listing of legitimate files. The whitelist may be available remotely over the Internet or locally in an endpoint computer. A legitimate file in a whitelist may be represented by its cryptographic hash, such as a hash generated using an SHA1 or MD5 hash function. To evaluate a target file, i.e., an unknown file being evaluated, the hash of the target file is generated and then compared to hashes of legitimate files in the whitelist. A match indicates that the target file is a legitimate file, and accordingly does not pose a security risk.

A property of a cryptographic hash is that a small change to a file results in a completely different hash. Therefore, a file with a cryptographic hash in a whitelist may no longer be identifiable in the whitelist if the file is modified even by a small amount. This prevents a target file from being identified as legitimate even if the target file is simply a new version of a whitelisted legitimate file.

In contrast to cryptographic hashes, similarity digests have the property that a small change to a file results in a small change to the file's similarity digest. The similarity between two files may be measured by comparing the similarity digests of the two files. Open source algorithms that may be employed to generate similarity digests include the SSDEEP, SDHASH, TLSH, and NILSIMSA algorithms.

The SSDEEP algorithm performs context-triggered piecewise hashing. Generally speaking, the SSDEEP algorithm divides a file into a plurality of segments and creates a checksum for each segment. The resulting digest is the concatenation of the checksums. The digests of two files may be compared and the two files are deemed to match if enough number of checksums match.

The SDHASH algorithm employs feature extraction to generate a hash. Generally speaking, the SDHASH algorithm extracts relatively long features (e.g., 64 bytes) that are of interest. The resulting digest is the encoded features of the file. The digests of two files may be compared and the two files are deemed to match if enough encoded features match.

TLSH and NILSIMSA are examples of locality-sensitive hashing algorithms. The NILSIMSA algorithm is focused on generating signatures for email anti-spam applications and does not work well on binary data. This makes the NILSIMSA algorithm unsuitable for executable files. The TLSH algorithm is described in various publications, including Oliver, J., Forman, S., and Cheng, C.: Using Randomization to Attack Similarity Digests, ATIS 2014, November, 2014, pages 199-210; Oliver, J., Cheng, C., Chen, Y.: TLSH—A Locality Sensitive Hash, 4th Cybercrime and Trustworthy Computing Workshop, Sydney, November 2013. Open source program code for implementing the TLSH algorithm is generally available on the Internet.

Generally speaking, a locality sensitive hash algorithm may extract many very small features (e.g., 3 bytes) of a file and put the features into a histogram. The resulting locality sensitive hash is the encoded histogram. The mathematical distance between locality sensitive hashes of two files may be scored to measure the similarity of the two files.

FIG. 1 schematically illustrates locality sensitive hashing that may be employed in embodiments of the present invention. FIG. 1 shows the contents of a file 120 and a file 121. In the example of FIG. 1, for each of the files 120 and 121, a locality sensitive hash is generated by locating features "IDS" and putting these features in a bucket (e.g., Bucket 56) of a histogram. Similarly, features "457" are located and placed in another bucket (e.g., Bucket 89) of the histogram. The histogram may be encoded to generate the locality sensitive hash. A distance measure of the locality sensitive hashes of the files 120 and 121 indicates the similarity between the files 120 and 121. Typical distance measures may range from 0 to well over 100. Except in very rare cases of collisions, a distance measure of 0 indicates that the two files being compared are identical. The degree of similarity may be varied depending on implementation particulars.

As will be more apparent below, embodiments of the present invention allow for evaluation of unknown files by providing a mechanism to rapidly compare similarity digests of unknown files using a searchable and scalable store of similarity digests of legitimate files. More particularly, similarity digests may be generated using the TLSH algorithm, for example. Similarity digests of legitimate files may be generated and added in a searchable and scalable digest store, such as a random decision forest data structure. The similarity digests of unknown files may be generated using the same TLSH algorithm employed to generate the similarity digests of the legitimate files. The digest store may be searched to determine if a similarity digest of an unknown file is similar to a similarity digest of a legitimate file. Embodiments of the present invention may be employed in a variety of computer security applications to improve the functionality and operation of a computer system, such as for whitelisting, overriding malware detection performed by a machine learning system, identifying corrupted legitimate files, and identifying new versions of legitimate files, for example.

Figure 2:
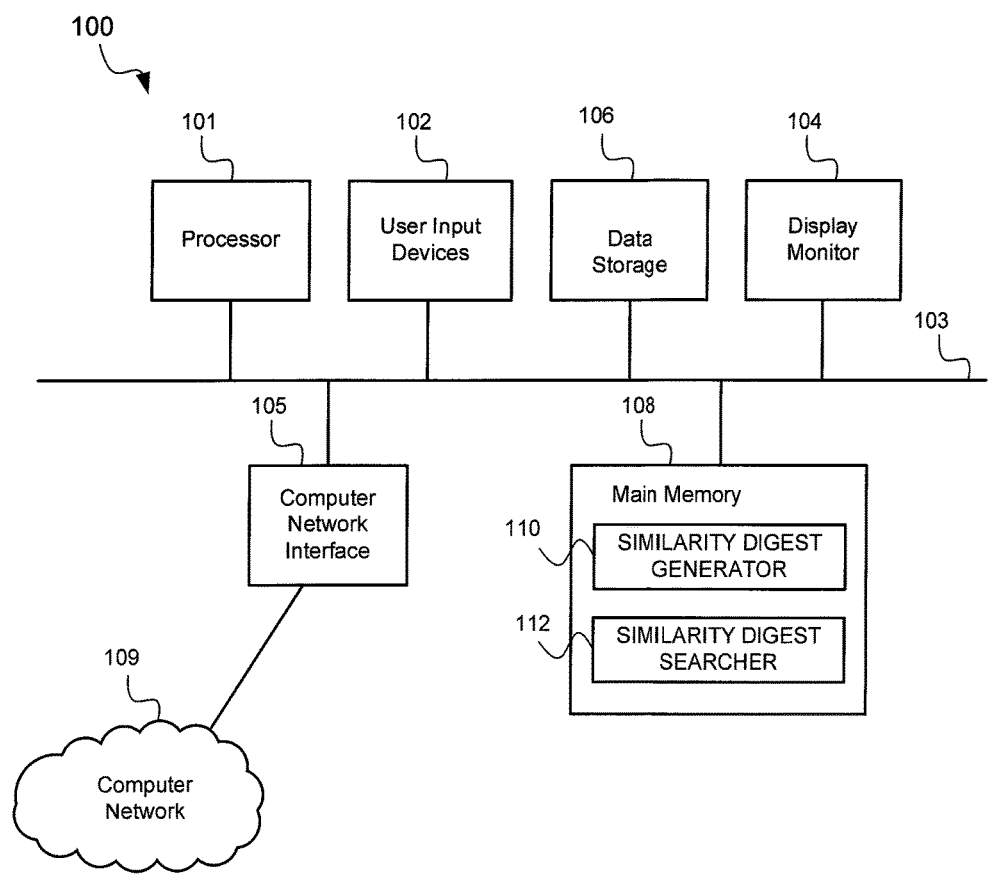
FIG. 2 shows a logical diagram of a computer system in accordance with an embodiment of the present invention.

Referring now to FIG. 2, there is shown a logical diagram of a computer system 100 in accordance with an embodiment of the present invention. The computer system 100 may be employed as an endpoint computer or a backend computer system. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 causes the computer system 100 to be operable to perform the functions of the one or more software modules. In the example of FIG. 1, the software modules comprise a similarity digest generator 110, a similarity digest searcher 112, and other software modules. As will be more apparent below, the similarity digest generator 110 and the similarity digest searcher 112 improve the computer system 100 itself by allowing for rapid and scalable evaluation of potentially detrimental files, a task that would otherwise be error-prone and take much longer to perform.

Figure 3:
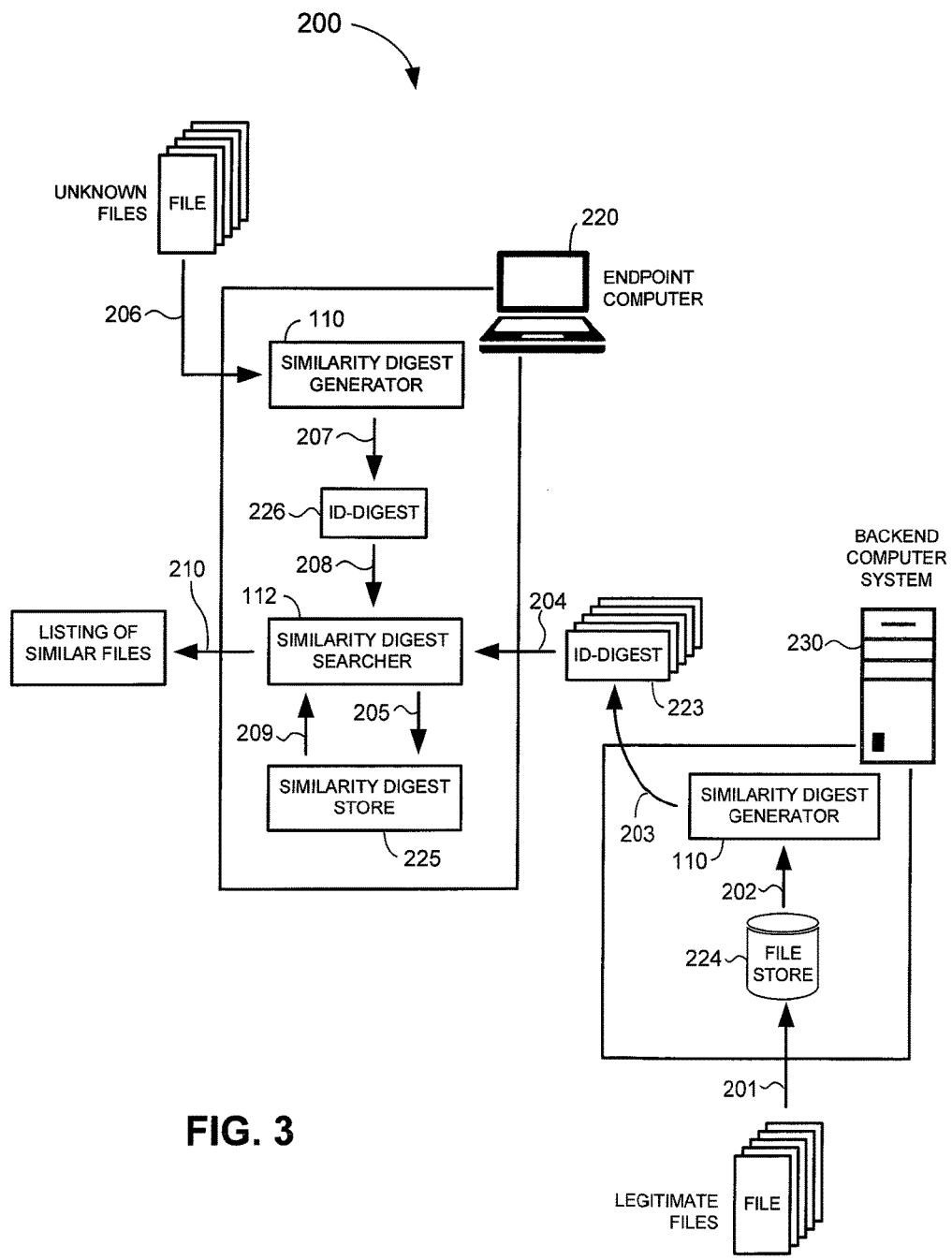
FIG. 3 shows a logical diagram of a system for identifying legitimate files in accordance with an embodiment of the present invention

FIG. 3 shows a logical diagram of a system 200 for identifying legitimate files in accordance with an embodiment of the present invention. In the example of FIG. 3, the system 200 includes one or more endpoint computers 220 and one or more backend computer systems 230. An endpoint computer 220 and a backend computer system 230 may communicate over the Internet, for example.

A backend computer system 230 may include a similarity digest generator 110 and a file store 224. In one embodiment, the backend computer system 230 receives a plurality of legitimate files for storage in the file store 224 (see arrow 201). Depending on the application, a legitimate file may be a file that is free of malicious code, authorized to be received in a computer network, or has some legitimate purpose in a computer system. Legitimate files may be received as submissions from trustworthy sources, including antivirus researchers, customers, and computer security vendors. The received legitimate files may be screened for security policy violations, malicious codes, etc. for verification.

The similarity digest generator 110 may be configured to generate a similarity digest for a file (see arrow 202). In one embodiment, the similarity digest generator 110 employs the TLSH algorithm to generate a locality sensitive hash for a file. The similarity digest generator 110 may also generate a globally unique identifier for a file. In the example of FIG. 3, the similarity digest generator 110 generates an ID-DIGEST pair 223 for each legitimate file (see arrow 203). In each ID-DIGEST pair 223, the ID identifies the legitimate file and the digest comprises a locality sensitive hash of the legitimate file.

An endpoint computer 220 may include its own similarity digest generator 110, a similarity digest searcher 112, and a similarity digest store 225. As in the backend computer system 230, the similarity digest generator 110 in the endpoint computer 220 generates a locality sensitive hash of a file. By using the same similarity digest algorithm (TLSH in one embodiment) in both the endpoint computer 220 and the backend computer system 230, the similarity digests of an unknown file and a legitimate file may be compared to determine if the unknown file is legitimate.

Figure 8:
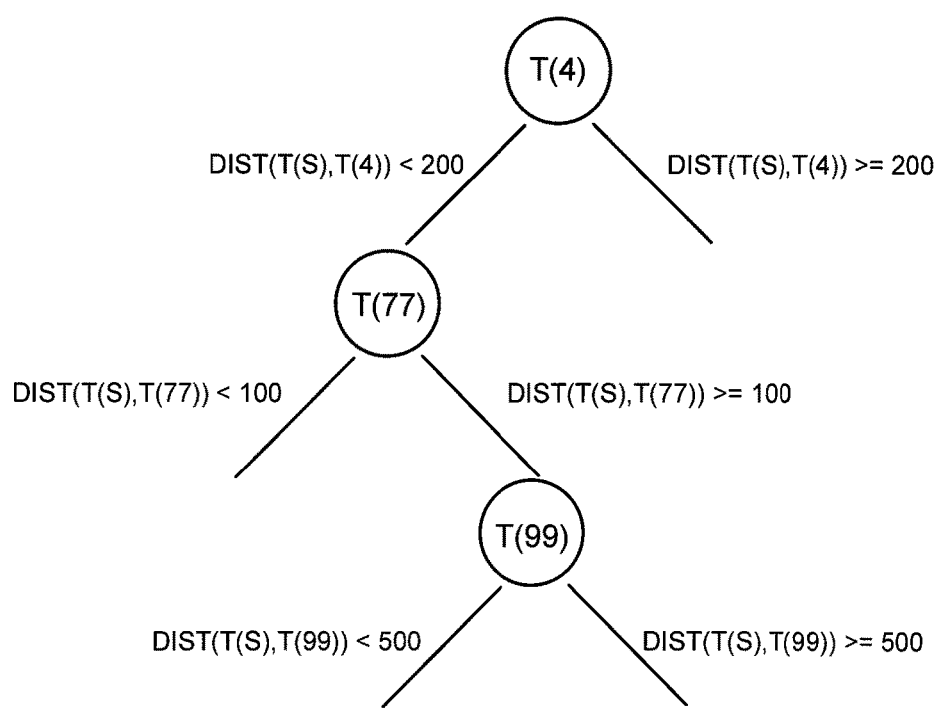
FIG. 8 shows an example tree of a random decision forest in accordance with an embodiment of the present invention.

The similarity digest searcher 112 may be configured to populate and search a similarity digest store 225. In one embodiment, the similarity digest store 225 comprises a random decision forest data structure. The random decision forest may be built by recursive partitioning. A split criteria in building the random decision forest may be to select an item/distance such that roughly 50% of the items go to the left and 50% of the items go to the right of a decision tree. A decision tree may be searched using an approximate nearest neighbor approach. This is schematically illustrated in FIG. 8, which shows an example tree of a random decision forest. In the example of FIG. 8, each of the decision nodes T(1)-T(n) of the tree corresponds to a similarity digest. To search the tree with a similarity digest T(S), the distance between T(S) and the node T(4) is determined. If the distance between T(S) and T(4) is less than 200, the decision step goes to the left. Otherwise, the decision step goes to the right if the distance between T(S) and T(4) is equal to or greater than 200. This is performed down the tree until the decision step reaches a leaf, at which point the distance between T(S) and each T(x) at the leaf is determined, with the closest being selected. The same procedure is repeated for the next tree in the random decision forest, and so on. Instead of random decision forest, the similarity digest searcher 112 may also employ other suitable indexing structures.

Referring back to the example of FIG. 3, the endpoint computer 220 receives a plurality of ID-DIGEST pairs 223 from the backend computer system 230 (see arrow 204). In the endpoint computer 220, the similarity digest searcher 112 adds the ID-DIGEST pairs 223 as file IDs and corresponding locality sensitive hashes in the similarity digest store 225, which in one embodiment comprises a random decision forest data structure (see arrow 205). The use of locality sensitive hash and random decision forest advantageously allows for rapid search of a scalable similarity digest store 225. The inventors believe that other similarity digests, such as SSDEEP and SDHASH hashes, are not suitable for fast searching and are not as scalable.

In the example of FIG. 3, the endpoint computer 220 receives one or more unknown files for evaluation (see arrow 206). An unknown file is "unknown" in that it is not known whether or not the file is legitimate. An unknown file being evaluated is also referred to herein as a target file. In the example of FIG. 3, for each target file, the similarity digest generator 110 generates an ID-DIGEST pair 226 (see arrow 207). An ID-DIGEST pair 226 is the same as an ID-DIGEST pair 223 except for a target file. More particularly, an ID-DIGEST pair 226 has a file ID (e.g., globally unique identifier) of the target file and a locality sensitive hash of the target file. The similarity digest searcher 112 receives the ID-DIGEST pair 226 (see arrow 208) and searches the similarity digest store 225 for similar legitimate files (see arrow 209). More particularly, the similarity digest searcher 112 compares the locality sensitive hash of the target file with the locality sensitive hashes of legitimate files in the random decision forest to determine if the target file is similar to one or more legitimate files. The similarity digest searcher 112 may return the result of the search as a listing of file IDs of similar legitimate files, if any is found (see arrow 210).

The just described process may be employed in one or more computer security applications, such as whitelisting. For example, the endpoint computer 220 may quarantine or block the target file if the target file is not similar to any legitimate file. More particularly, in the example of FIG. 3, the similarity digest store 225 may be considered as a whitelist of legitimate files. Each similarity digest in the similarity digest store 225 is an entry in the whitelist, and a similarity digest of a target file may be compared to similarity digests in the similarity digest store 225 to determine whether or not the target file is whitelisted, i.e., belonging to the whitelist. The endpoint computer 220 may take a response action against a target file that is not whitelisted. For example, the endpoint computer 220 may quarantine or block reception of any file that is not whitelisted. In marked contrast to conventional whitelists, the similarity digest store 225 is less susceptible to false negatives by taking into account small differences between files. Furthermore, by using a locality sensitive hash, the similarity digest store 225 may be rapidly searched and is scalable to accommodate an increasing number of entries.

Figure 4:
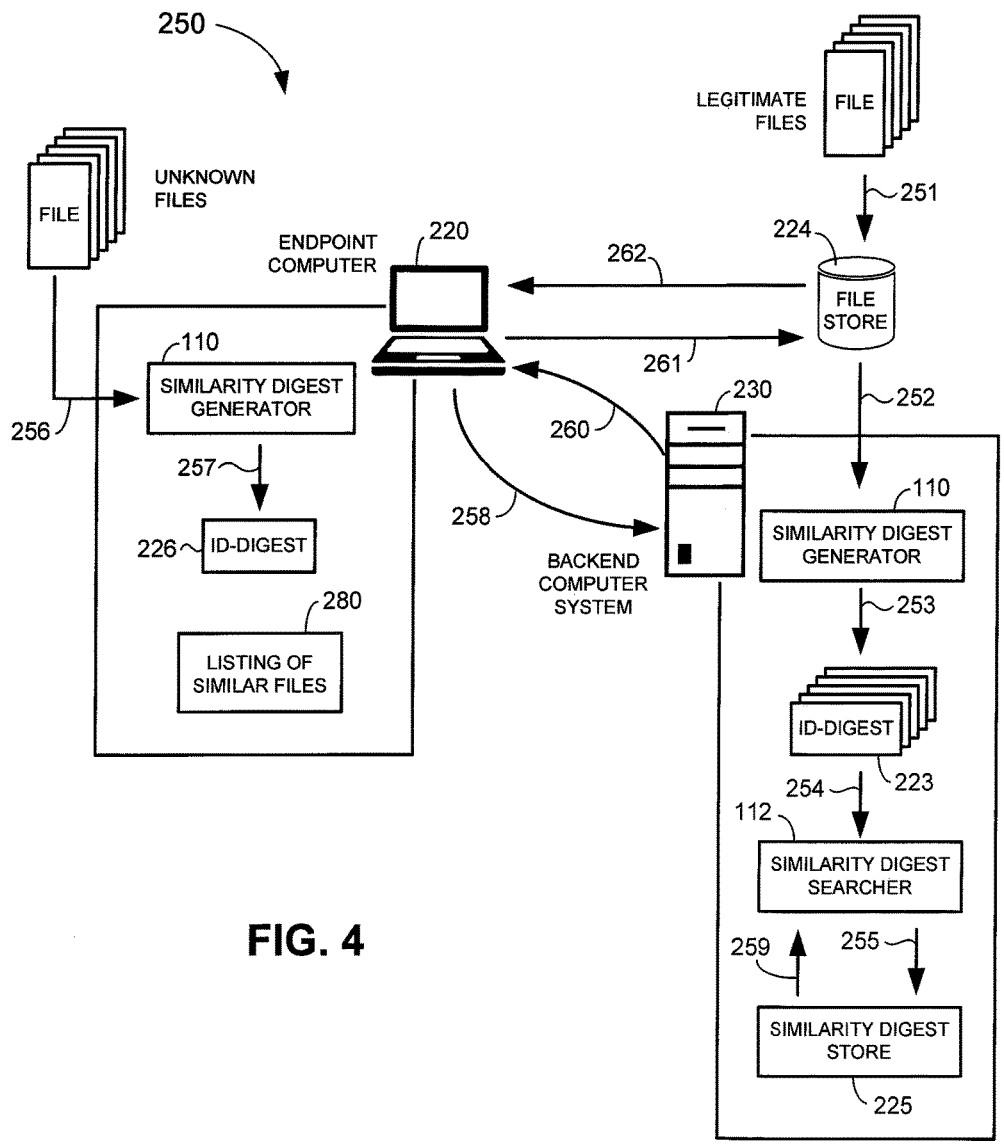
FIG. 4 shows a logical diagram of a system for identifying legitimate files in accordance with an embodiment of the present invention.

FIG. 4 shows a logical diagram of a system 250 for identifying legitimate files in accordance with an embodiment of the present invention. In the example of FIG. 4, the evaluation of an unknown file for similarity with a legitimate file is provided as a web service.

In the example of FIG. 4, the backend computer system 230 receives legitimate files for storage in the file store 224 (see arrow 251). The similarity digest generator 110 in the backend computer system 230 receives a legitimate file (see arrow 252) and generates an ID-DIGEST pair 223 for the file (see arrow 253). As previously explained, the ID-DIGEST pair 223 may have a file ID of the legitimate file and a corresponding similarity digest of the legitimate file, which in this embodiment is a locality sensitive hash. In the example of FIG. 4, the backend computer system 230 includes the similarity digest searcher 112, which receives the ID-DIGEST 223 (see arrow 254) and adds the ID-DIGEST 223 to the similarity digest store 225 (see arrow 255). The similarity digest store 225 may comprise a random decision forest data structure.

In the example of FIG. 4, the endpoint computer 220 includes the same similarity digest generator 110 as in the backend computer system 230. The endpoint computer 220 receives one or more unknown files for evaluation (see arrow 256). The evaluation may involve determining whether or not an unknown file is whitelisted, for example. The similarity digest generator 110 in the endpoint computer 220 may generate the similarity digest of a target file using the same locality sensitive hashing algorithm employed in the backend computer system 230. The similarity digest generator 110 outputs an ID-DIGEST pair 226 that includes a file ID of the target file and the similarity digest of the target file, which in this example is a locality sensitive hash. The endpoint computer 220 forwards the ID-DIGEST pair 226 to the backend computer system 230 over the Internet or some other computer network (see arrow 258).

In the backend computer system 230, the similarity digest searcher 112 compares the similarity digest of the target file to similarity digests of legitimate files that are in the similarity digest store 225 (see arrow 259). More particularly, the similarity digest searcher 112 determines the similarity between the locality sensitive hash of the target file and the locality sensitive hashes of legitimate files in the random decision forest to determine if the target file is similar to one or more legitimate files stored in the file store 224. The backend computer system 230 provides the file ID of one or more identified similar legitimate files to the endpoint computer 220 (see arrow 260). The file IDs of legitimate files that have been identified to be similar to the target file may be included in a listing of similar files 280. The target file may be considered to be whitelisted if the target file is similar to a legitimate file. The degree of similarity may be adjusted in the similarity digest searcher 112 and will vary depending on particulars of the implementation.

Optionally, the endpoint computer 220 may obtain further details of the identified similar legitimate files. For example, the endpoint computer 220 may use the file IDs of the identified similar legitimate files and file ID of the target file as parameters in a query submitted to the file store 224 (see arrow 261). The file store 224 may be implemented as part of the backend computer system 230 or in a separate file reputation web service, such as the TREND MICRO Goodware Resource Information Database (GRID). The file store 224 may retrieve additional information (e.g., metadata, originator, version, etc.) for the target and legitimate files identified in the query by their file IDs. The endpoint computer 220 may receive the additional information about the target and legitimate files and use the additional information to make further determination as to whether or not the target file poses a security threat. For example, the additional information may reveal that the target file and the similar legitimate files are digitally signed by the same legitimate entity or are simply different versions of the same file, leading to the conclusion that the target file may also be a legitimate file.

The endpoint computer 220 may take a response action against a target file that is not similar to any legitimate file. For example, the endpoint computer 220 may quarantine or block a target file that is not similar to any legitimate file identified in the similarity digest store 225.

Figure 5:
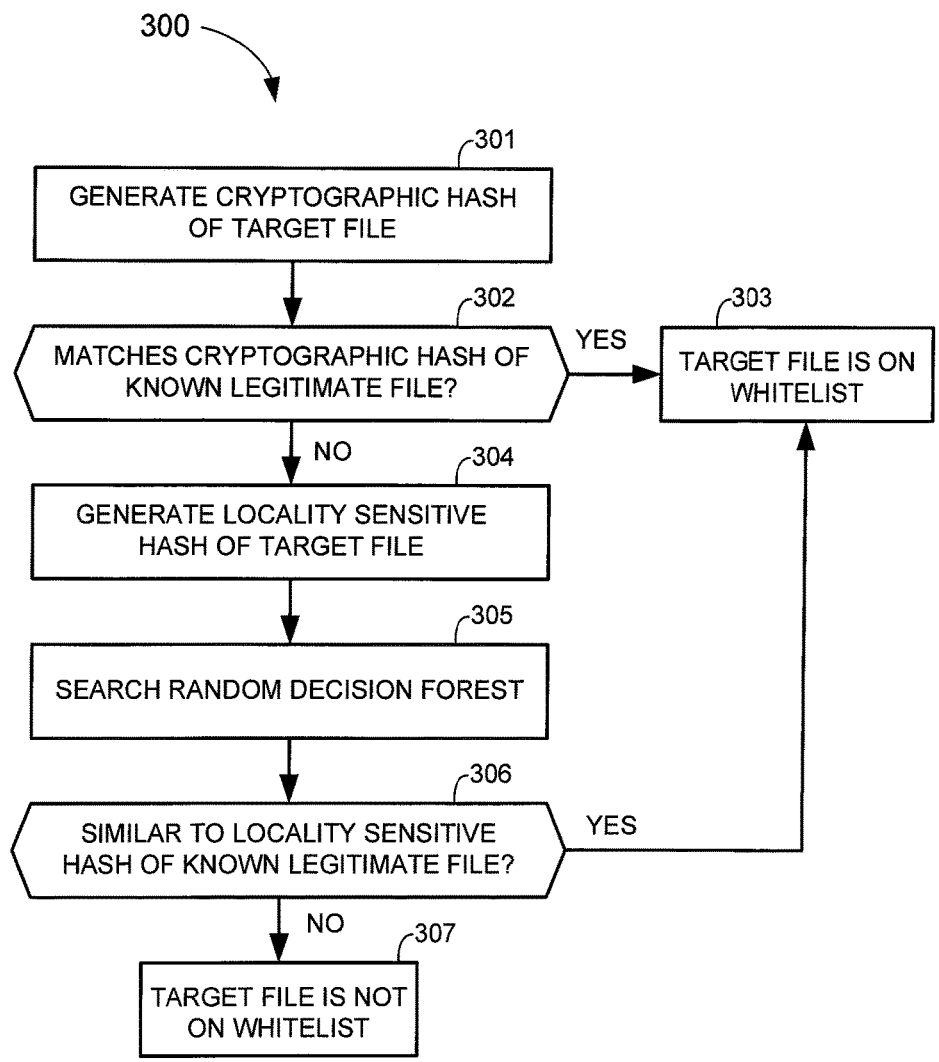
FIG. 5 shows a flow diagram of a computer-implemented method of whitelisting legitimate files in accordance with an embodiment of the present invention.

FIG. 5 shows a flow diagram of a computer-implemented method 300 of whitelisting legitimate files in accordance with an embodiment of the present invention. The method 300 may be employed to determine whether or not a target file being evaluated is whitelisted, i.e., a file included in the whitelist. A target file that is whitelisted may be deemed to be legitimate. Generally speaking, a response action may be taken by the computer against a target file that is not on the whitelist. For example, the computer may quarantine the target file, block the target file, prevent the target file from being executed, alert a user or administrator, or perform other response actions to protect the computer.

In the method 300, a cryptographic hash of a target file is generated (step 301). The cryptographic hash of the target file is compared to cryptographic hashes of legitimate files to determine if there is a match (step 302). In one embodiment, the cryptographic hashes of the target file and of the legitimate files are generated using the SHA1 function. The cryptographic hash of the target file may be forwarded to a file reputation service, which compares the cryptographic hash of the target file to cryptographic hashes of legitimate files. If the cryptographic hash of the target file matches a cryptographic hash of a legitimate file, the target file is deemed to be on the whitelist (step 302 to step 303). Otherwise, if the cryptographic hash of the target file does not match a cryptographic hash of a legitimate file, the locality sensitive hash of the target file is generated (step 302 to step 304).

The locality sensitive hash of the target file may be generated using the TLSH algorithm. The locality sensitive hashes of legitimate files may also be generated using the TLSH algorithm and added to a random decision forest data structure. The random decision forest may be searched for a locality sensitive hash of a legitimate file that is similar to the locality sensitive hash of the target file (step 305). If the search of the random decision forest indicates that the locality sensitive hash of the target file is similar to the locality sensitive hash of at least one legitimate file, the target file is deemed to be on the whitelist (step 306 to step 303). Otherwise, if the locality sensitive hash of the target file does not match a locality sensitive hash of any legitimate file, the target file is deemed to be not on the whitelist (step 306 to step 307). Table 1 below shows an example pseudocode for the method 300.

TABLE 1

Calculate SHA1(File)
Status=NOT whitelisted
IF SHA1 is on GRID THEN
   status=whitelist TABLE 1-continued ELSE
   calculate TLSH(File)
   IF TLSH(File) similar to some file in GRID THEN
      status=whitelist
   ENDIF
ENDIF
return(status)

Figure 6:
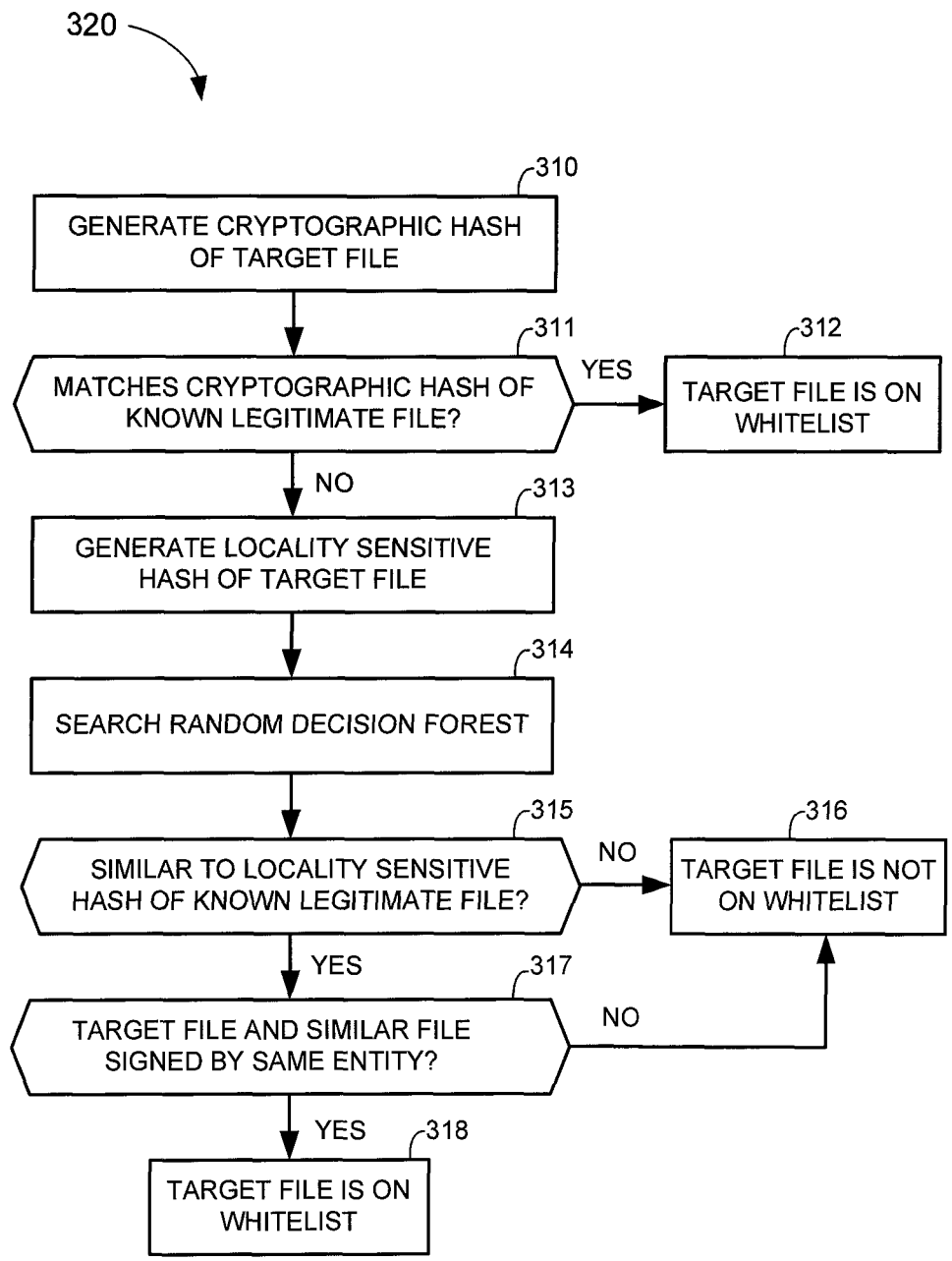
FIG. 6 shows a flow diagram of a computer-implemented method of whitelisting legitimate files in accordance with an embodiment of the present invention.

FIG. 6 shows a flow diagram of a computer-implemented method 320 of whitelisting legitimate files in accordance with an embodiment of the present invention. The method 320 may be employed to determine whether or not a target file being evaluated is whitelisted.

In the method 320, a cryptographic hash of a target file is generated (step 310) and compared to cryptographic hashes of legitimate files to determine if there is a match (step 311). In one embodiment, the cryptographic hashes of the target file and of the legitimate files are generated using the SHA1 function. The cryptographic hash of the target file may be forwarded to a file reputation service, which compares the cryptographic hash of the target file to cryptographic hashes of legitimate files. If the cryptographic hash of the target file matches a cryptographic hash of a legitimate file, the target file is deemed to be on the whitelist (step 311 to step 312). Otherwise, if the cryptographic hash of the target file does not match a cryptographic hash of a legitimate file, the locality sensitive hash of the target file is generated (step 311 to step 313).

In the method 320, the locality sensitive hash of the target file may be generated using the TLSH algorithm. The locality sensitive hashes of legitimate files may also be generated using the TLSH algorithm and added to a random decision forest data structure. The random decision forest may be searched for a locality sensitive hash of a legitimate file that is similar to the locality sensitive hash of the target file (step 314). If the search of the random decision forest indicates that the locality sensitive hash of the target file is not similar to any of the locality sensitive hashes of the legitimate files, the target file is deemed to be not on the whitelist (step 315 to step 316).

If the locality sensitive hash of at least one legitimate file is similar to the locality sensitive hash of the target file (step 315 to step 317), the target file is deemed to be on the whitelist if the target file and the similar legitimate file are digitally signed by the same entity (step 317 to step 318). Otherwise, even if the locality sensitive hash of at least one legitimate file is similar to the locality sensitive hash of the target file (step 315 to step 317), the target file is deemed to be not on the whitelist if the target file and the similar legitimate file are not digitally signed by the same entity (step 317 to step 316). Table 2 below shows an example pseudocode for the method 320.

TABLE 2

Calculate SHA1(File)
Status=NOT whitelisted
IF SHA1 is on GRID THEN
   status=whitelist
ELSE
   calculate TLSH(File)
   IF TLSH(File) similar to some file G in GRID THEN
      Does G have certificate signed by Entity?
      IF File has certificate signed from Entity THEN
         status=whitelist
      ENDIF
   ENDIF TABLE 2-continued

```
    ENDIF
    return(status)
```

Embodiments of the present invention may also be employed to improve performance of machine learning systems that are used to detect malware. More particularly, because a machine learning system does not perform exact pattern matching but instead relies on its training data set to detect malware, the machine learning system may be prone to false positives, i.e. erroneously deeming a legitimate file to be malware. This feature of the present invention is now described with reference to FIG. 7.

Figure 7:
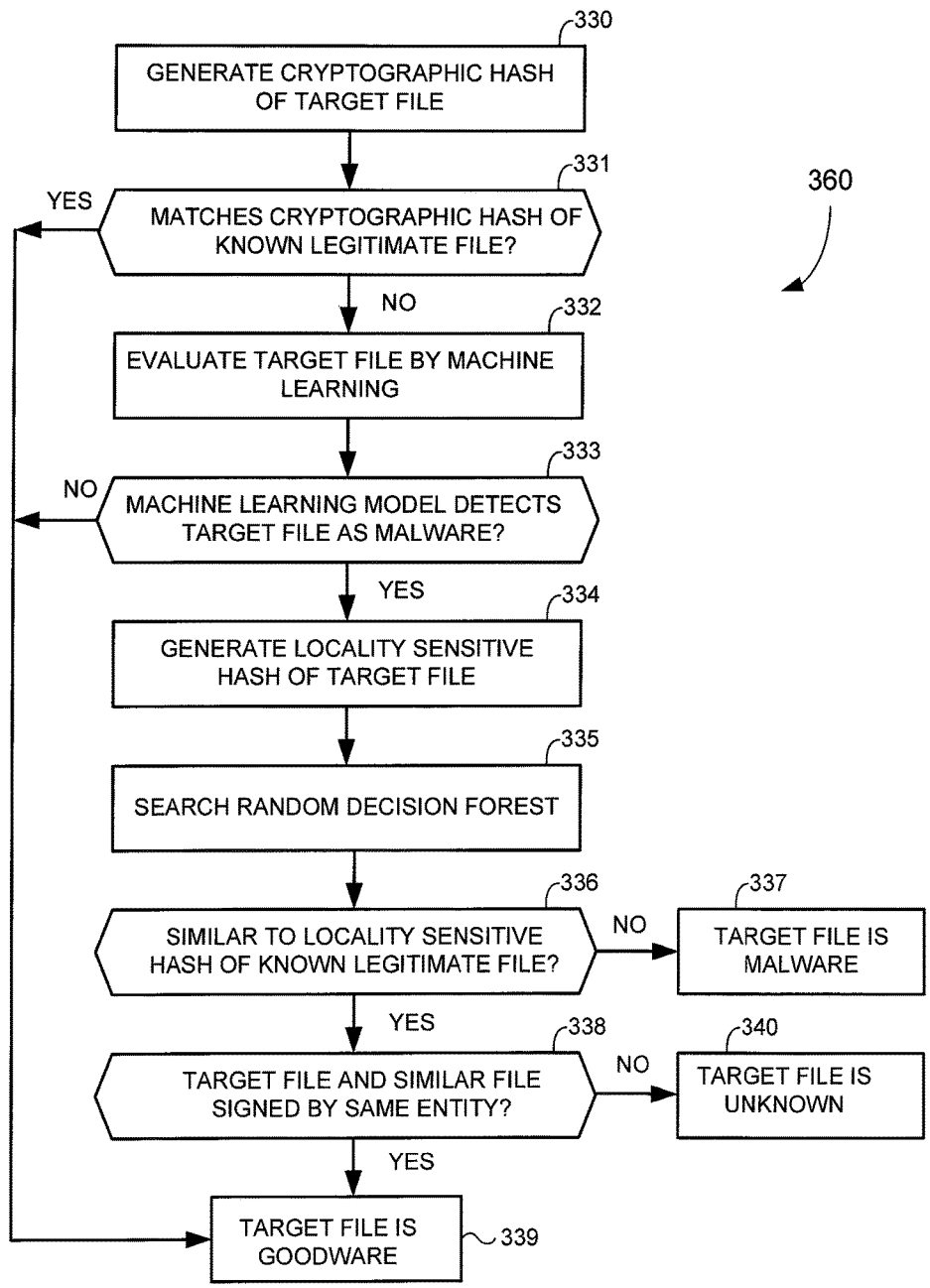
FIG. 7 shows a flow diagram of a computer-implemented method of detecting malware in accordance with an embodiment of the present invention.

FIG. 7 shows a flow diagram of a computer-implemented method 360 of detecting malware in accordance with an embodiment of the present invention. The method 360 may be employed to determine whether or not the target file being evaluated is malware.

In the method 360, a cryptographic hash of a target file is generated (step 330) and compared to cryptographic hashes of legitimate files to determine if there is a match (step 331). In one embodiment, the cryptographic hashes of the target file and of the legitimate files are generated using the SHA1 function. The cryptographic hash of the target file may be forwarded to a file reputation service, which compares the cryptographic hash of the target file to cryptographic hashes of legitimate files. If the cryptographic hash of the target file matches a cryptographic hash of a legitimate file, the target file is deemed to be normal file, i.e., not malware (step 331 to step 339). A normal file is also referred to as "goodware."

If the cryptographic hash of the target file does not match a cryptographic hash of a legitimate file, a machine learning system is employed to evaluate the target file for malware (step 331 to step 332). Any suitable machine learning system may be employed. If the machine learning system does not detect the target file to be malware, the target file is deemed to be normal (step 333 to step 339).

If the machine learning system detects the target file to be malware, a locality sensitive hash of the target file is generated (step 333 to step 334). A random decision forest comprising locality sensitive hashes of legitimate files is searched for a locality sensitive hash of a legitimate file that is similar to the locality sensitive hash of the target file (step 335). The locality sensitive hashes of the target file and of the legitimate files may be generated using the TLSH algorithm, for example.

If the search of the random decision forest indicates that the locality sensitive hash of the target file is not similar to any of the locality sensitive hashes of the legitimate files, the target file is deemed to be malware (step 336 to step 337).

If the locality sensitive hash of at least one legitimate file is similar to the locality sensitive hash of the target file (step 336 to step 338), the target file is deemed to be normal if the target file and the similar legitimate file are digitally signed by the same entity (step 338 to step 339). Otherwise, even if the locality sensitive hash of at least one legitimate file is similar to the locality sensitive hash of the target file (step 336 to step 338), the target file is deemed to be an unknown file if the target file and the similar legitimate file are not digitally signed by the same entity (step 338 to step 340). An unknown file has no classification, and may be further evaluated using other mechanisms (e.g., evaluating the target file in a sandbox; triggering an alert to notify a user or administrator). Table 3 below shows an example pseudocode for the method 360.

TABLE 3

```
Status=not detect
If match GRID (File) THEN
    status=goodware
Else If Machine_Learning detects (File) THEN
    calculate TLSH(File)
    IF TLSH(File) similar to some file G in GRID THEN
        IF File signed by same entity as G THEN
            status=goodware
        ELSE
            status=not detect
            //maybe put in sandbox OR analyze with signatures OR alert
        ENDIF
    ELSE
        status=detect
    ENDIF
ENDIF
return(status)
```

Methods and systems for identifying legitimate files have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of evaluating a file to determine if the file is on a whitelist, the method comprising:
    adding known good locality sensitive hashes of legitimate files in a random decision forest data structure;
    generating a cryptographic hash of a target file;
    generating a locality sensitive hash of the target file;
    searching the random decision forest data structure to find a known good locality sensitive hash that is similar to the locality sensitive hash of the target file;
    deeming the target file to be on the whitelist in response to detecting that the cryptographic hash of the target file does not match any known good cryptographic hash and the locality sensitive hash of the target file is similar to the known good locality sensitive hash found in the random decision forest data structure; and
    taking a response action against the target file when the target file is not deemed to be on the whitelist.

2. The computer-implemented method of claim 1, wherein the target file is deemed to be on the whitelist when the cryptographic hash of the target file does not match any known good cryptographic hash, the locality sensitive hash of the target file is similar to the known good locality sensitive hash found in the random decision forest, and the target file and a legitimate file from which the known good locality hash was generated are digitally signed by the same entity.

3. The computer-implemented method of claim 1, wherein the response action includes putting the target file in quarantine.

4. A system comprising:
    an endpoint computer comprising a processor and a memory that comprises instructions that when executed by the processor of the endpoint computer cause the endpoint computer to receive locality sensitive hashes of legitimate files over a computer network, receive a target file, generate a locality sensitive hash of the target file, detect that a cryptographic hash of the target file does not match any known good cryptographic hash, search a random decision forest data structure to find a locality sensitive hash of a legitimate file that is similar to the locality sensitive hash of the target file, and detect that the target file is legitimate in response to detecting that the cryptographic hash of the target file does not match any known good cryptographic hash, the locality sensitive hash of the target file is similar to the locality sensitive hash of the legitimate file, and the target file and the legitimate file are digitally signed by a same entity; and a backend computer system comprising a processor and a memory that comprises instructions that when executed by the processor of the backend computer system causes the backend computer system to receive the legitimate files, generate the locality sensitive hashes of the legitimate files, and provide the locality sensitive hashes of the legitimate files to the endpoint computer over the computer network.

5. The system of claim 4, wherein the processor of the endpoint computer executes the instructions in the memory of the endpoint computer to cause the endpoint computer to receive a file identifier of the legitimate file and query a file reputation service for additional information regarding the legitimate file.

6. A computer-implemented method of evaluating a file, the method comprising:

receiving a target file;

evaluating the target file for malware using a machine learning system;

generating a locality sensitive hash of the target file;

detecting that the locality sensitive hash of the target file is similar to a locality sensitive hash of a legitimate file; and detecting that the target file is not malware in response to the machine learning system deeming the target file to be malware, the locality sensitive hash of the target file being similar to the locality sensitive hash of the legitimate file, and the target file and the legitimate file being digitally signed by a same entity.

7. The computer-implemented method of claim 6, further comprising:

adding locality sensitive hashes of the legitimate files in a random decision forest data structure; and searching the random forest data structure for one or more locality sensitive hashes that are similar to the locality sensitive hash of the target file.

8. The computer-implemented of claim 7, further comprising:

prior to evaluating the target file for malware using the machine learning system, detecting that a cryptographic hash of the target file does not match a known good cryptographic hash.

9. The computer-implemented method of claim 6, further comprising:

querying a file reputation service for additional information regarding the legitimate file.

* * * * *